(12) United States Patent
Lin et al.

(10) Patent No.: US 7,457,294 B2
(45) Date of Patent: Nov. 25, 2008

(54) CIRCUIT AND A METHOD FOR FORWARDING DATA PACKETS IN A NETWORK

(75) Inventors: Jinan Lin, Ottobrunn (DE); Sankamarayan Jagannathan, Bangalore (IN); Xiaoning Nie, Neubiberg (DE)

(73) Assignee: Infineon Technologies AG, Munich (DE)

( * ) Notice: Subject to any disclaimer, the term of this patent is extended or adjusted under 35 U.S.C. 154(b) by 572 days.

(21) Appl. No.: 11/259,957

(22) Filed: Oct. 27, 2005

(65) Prior Publication Data
US 2006/0104277 A1    May 18, 2006

(30) Foreign Application Priority Data
Oct. 28, 2004    (DE) ........................ 10 2004 052 417

(51) Int. Cl.
*H04L 12/28* (2006.01)
(52) U.S. Cl. ........................ 370/392; 709/238
(58) Field of Classification Search .................. 370/392
See application file for complete search history.

(56) References Cited

U.S. PATENT DOCUMENTS 5,915,097 A    6/1999    Chao

| 2003/0123445 A1 * | 7/2003 | Duranton et al. ............ 370/392 |
| 2004/0103349 A1 | 5/2004 | Nardini et al. |
| 2006/0106940 A1 * | 5/2006 | Jagannathan et al. ........ 709/238 |

FOREIGN PATENT DOCUMENTS

| EP | 1 394 999 A1 | 3/2003 |
| GB | 2 374 694 A | 10/2002 |

* cited by examiner

*Primary Examiner*—Chirag G Shah
*Assistant Examiner*—Otis L Thompson, Jr.
(74) *Attorney, Agent, or Firm*—Maginot, Moore & Beck

(57) ABSTRACT

In a method for forwarding data packets in a network a circuit comprises a data storage and a control device. Each data packet has a destination address and the data storage comprises T data sub-storages for storing all network addresses which are coded by a particular coding method on the basis of their respective key bit length in precisely one of the data sub-storages. The t-th data sub-storage is divided into blocks having D data elements of identical data element bit length, where $t \in [1, \ldots, T]$ and D is the smallest common multiple of $t \in [1, \ldots, T]$. The control device receives data packets, each having a destination address, codes a destination address of a received data packet using the particular coding method to produce a coded key, and compares the coded key on the basis of its key bit length with the coded addresses stored in the corresponding data sub-store block by block in order to forward the respective data packet via an output to the destination address whose associated coded address matches the coded key from the respective received data packet.

27 Claims, 6 Drawing Sheets

FIG 3

| V2 | n=1 | n=2 | n=3 | n=4 | |
|---|---|---|---|---|---|
| V2-1 | k1 | k1 | k1 | k1 | —B5 |
| V2-2 | k1 | k2 | k2 | k2 | |
| V2-3 | k1 | k1 | k3 | k3 | |
| V2-4 | k1 | k2 | k1 | k4 | |
| V2-5 | k1 | k1 | k2 | k1 | |
| V2-6 | k1 | k2 | k3 | k2 | |
| V2-7 | k1 | k1 | k1 | k3 | |
| V2-8 | k1 | k2 | k2 | k4 | |
| V2-9 | k1 | k1 | k3 | k1 | |
| V2-10 | k1 | k2 | k1 | k2 | |
| V2-11 | k1 | k1 | k2 | k3 | |
| V2-12 | k1 | k2 | k3 | k4 | |

FIG 5

| 0 | n=1 | n=2 | n=3 | n=4 |
|---|---|---|---|---|
| o1 | o1 | o1&o2 | o1&o2&o3 | o1&o2&o3&o4 |
| o2 | o2 | o3&o4 | o4&o5&o6 | o5&o6&o7&o8 |
| o3 | o3 | o5&o6 | o7&o8&o9 | o9&o10&o11&o12 |
| o4 | o4 | o7&o8 | o10&o11&o12 | |
| o5 | o5 | o9&o10 | | |
| o6 | o6 | o11&o12 | | |
| o7 | o7 | | | |
| o8 | o8 | | | |
| o9 | o9 | | | |
| o10 | o10 | | | |
| o11 | o11 | | | |
| o12 | o12 | | | |

CIRCUIT AND A METHOD FOR FORWARDING DATA PACKETS IN A NETWORK

BACKGROUND OF THE INVENTION

1. Field of the Invention

The invention relates to a circuit and a method for forwarding data packets in a network.

2. Description of the Related Art

When forwarding data packets in a network, particularly in an IP network, an important and also most critical functionality of the router or IP network router used is to find which output port is to be used to forward a received data packet, so that it finally reaches its destination address. To this end, the destination address contained in the received data packet is used for comparison with the destination addresses stored in a lookup table in the router. Each destination address stored in the lookup table is linked to an output port in the router, so that in the event of a positive comparison the data packet is forwarded via the output port which is currently linked to the corresponding destination address initiating the positive comparison. Disadvantageously, a large and costly amount of memory space needs to be provided for the network's destination addresses which need to be stored in the lookup table. In addition, a large amount of time and computation involvement is required for comparing the destination address from the received data packet with each destination address stored in the lookup table.

Published European application for patent EP 1 394 999 A1 describes a method for compressing the destination addresses which need to be stored in the router's lookup table or memory. By way of example, the destination addresses are compressed losslessly using the Huffman algorithm to produce coded keys. This means that the memory space requirement for the coded keys which are to be stored is significantly reduced in comparison with destination addresses which are to be stored. However, there is also the problem that the compressed keys are not the same length, i.e. do not have a constant key bit length, on account of the Huffman coding. The inconstant key bit length of the coded keys which are to be stored gives rise to problems in the memory organization. Since coded keys with a relatively short bit length arise more frequently than coded keys with longer bit lengths on account of the Huffman algorithm used, the set of comparators which needs to be provided on account of the coded keys which arise with longer bit lengths is fully utilized only in the rarest cases. This results in a reduction in the possible throughput during address comparison.

SUMMARY OF THE INVENTION

It is an object of the present invention to provide less expensive and faster forwarding of data packets in a network. The object is achieved in accordance with the invention by means of a circuit for forwarding data packets, which each have a destination address, in a network, where the circuit has:

a data store for storing all network addresses which are coded by a particular coding method on the basis of their respective key bit length in precisely one of T subsidiary data stores of the data store, where each of the T subsidiary data stores is divided into blocks of in each case D data elements of identical data element bit length, where D is the smallest common multiple of T; and having a control device receiving data packets which codes the destination address contained in the respective received data packet using the particular coding method to produce a key and compares the coded key on the basis of its key bit length in respective blocks with the stored, coded addresses in the corresponding subsidiary data store in order to forward the respective data packet via an output to the destination address whose associated coded address matches the coded key from the received data packet.

The object is also achieved in accordance with the invention by means of a method for forwarding data packets in a network, where the method has the following method steps:

a) all destination addresses in the network are stored as addresses coded using a particular coding method on the basis of their respective key bit length in precisely one of T subsidiary data stores of a data store in each case, with each of the T subsidiary data stores being divided into blocks of D data elements of identical data element bit length, where D is the smallest common multiple of T;

b) a data packet is received;

c) a destination address is extracted from the received data packet;

d) the destination address from the received data packet is coded to produce a coded key using the particular coding method;

e) the coded key from the received data packet is compared in respective blocks on the basis of its key bit length with the stored, coded addresses in the corresponding subsidiary data store, and;

f) the data packet is forwarded via an output to the destination address whose associated coded address matches the coded key from the received data packet.

Advantageously, the provision of the corresponding subsidiary data stores for the corresponding coded keys for various key bit lengths significantly improves the memory organization of the data store. This may significantly reduces the need for memory space, which saves costs. In addition, a coded key from a received data packet is compared only with the coded addresses in the corresponding subsidiary data store which stores exclusively coded addresses whose key bit length corresponds to the key bit length of the coded key. This means that the comparison is reduced exclusively to the coded addresses in the corresponding subsidiary data store. This makes forwarding the data packet significantly faster on account of the reduced comparison. The comparison of the coded key from the received data packet with the stored, coded addresses in the corresponding subsidiary data store in respective blocks means that the throughput of the address comparison is increased, which results in faster forwarding of the received data packets. This applies particularly to coded keys with a short key bit length.

In a restricted version of the inventive circuit, the respective t-th subsidiary data store, where $t \in [1, \ldots, T]$, is divided into S memory blocks and the respective memory block in the corresponding t-th subsidiary data store is formed by t data elements, with all destination addresses in the network being stored as coded addresses on the basis of their key bit length in precisely one memory block in the corresponding subsidiary data store in each case. Advantageously, a coded key from a received data packet is then compared on the basis of its key bit length only with the coded addresses which are stored in the corresponding t-th subsidiary data store. This significantly reduces the computation involvement for the address comparison and saves time.

All the T subsidiary data stores may have an identical subsidiary data store bit length. This advantageously simplifies and improves the memory organization of the data store.

In line with a further preferred development, the number S of memory blocks in the respective t-th subsidiary data store is the quotient of the number D of data elements in the subsidiary data store and t.

The circuit may use a lossless compression algorithm as the particular coding algorithm.

In another restricted version of the inventive method, the circuit uses a Huffman algorithm, an arithmetic algorithm or a Lempel-Ziv algorithm as lossless compression algorithm. Advantageously, this compresses the coded keys such that firstly the entropy of the destination address is completely removed and secondly the coded keys which appear with the highest probability have the shortest key bit length. This significantly reduces the complexity or computation involvement for the subsequent address comparison.

The control device may use a rounded-up quotient for the key bit length of the coded key from the received data packet and the data element bit length to generate a key association identifier which indicates which subsidiary data store stores the coded address which corresponds to the coded key from the received data packet. Advantageously, the generated key association identifier indicates, in simple fashion, that subsidiary data store in which it is necessary to perform the address comparison for the received, coded key. This further reduces the computation involvement for the address comparison.

The control device may have a memory block pointer generator which, on the basis of the key association identifier, generates a memory block pointer for each read cycle which respectively points to the next block to be read in the corresponding subsidiary data store. Advantageously, the memory block pointer generator generated indicates that subsidiary data store in which the address comparison needs to be continued in which block of D data elements.

In another restricted version of the inventive circuit, the control device generates the memory block pointer for the current read cycle from a total for the memory block pointer for the preceding read cycle and the key association identifier, so that the data store provides the D data elements following the memory block pointer in the form of the block of D data elements.

The control device may have a distribution device which, on the basis of the key association identifier, distributes the coded key from the received data packet over a number of different key elements, with a key element bit length corresponding to the data element bit length, and the number of different key elements corresponding to the key association identifier, and which multiplies the number of different key elements such that a key element vector of D key elements is produced.

The control device may have a comparator device which contains D comparators, with each of the D comparators having a comparator bit length which corresponds to the data element bit length.

The D comparators may compare the key element vector of the D key elements with a block of D data elements in each case, and, on the basis of the comparison, provide a vector of D output signals, the control device setting an output signal to one in the event of a positive comparison and to zero in the event of a negative comparison. The fact that the key element bit length, the data element bit length and the comparator bit length correspond to one another and also the dimensions of the key element vector and of the block of D elements correspond to the number of comparators means that it is advantageously always a certainty for the comparators to be fully utilized. This means that the resources of the inventive circuit are used fully and the speed during address comparison is maximized.

In another restricted version of the inventive circuit, the control device has a combinational logic unit which logically combines the D output signals on the basis of the key association identifier and uses the logic combination to decide on the output which the control device needs to use to forward the received data packet. Advantageously, the key association identifier already generated is used for logically combining the D output signals with one another in order to decide on the output which the control unit needs to use to forward the data packet.

The inventive circuit may be part of an IP router.

The data store may be a RAM store.

The invention is explained in more detail below with reference to the exemplary embodiments indicated in the schematic figures, in which:

DESCRIPTION OF THE DRAWINGS

FIG. 3 is a schematic table for generating the key element vector on the basis of the key association identifier based on the first exemplary embodiment;

FIG. 5 is a schematic table for logically combining the output signals using the combinational logic unit based on the first exemplary embodiment.

DESCRIPTION OF THE PREFERRED EMBODIMENTS

Figure 1:
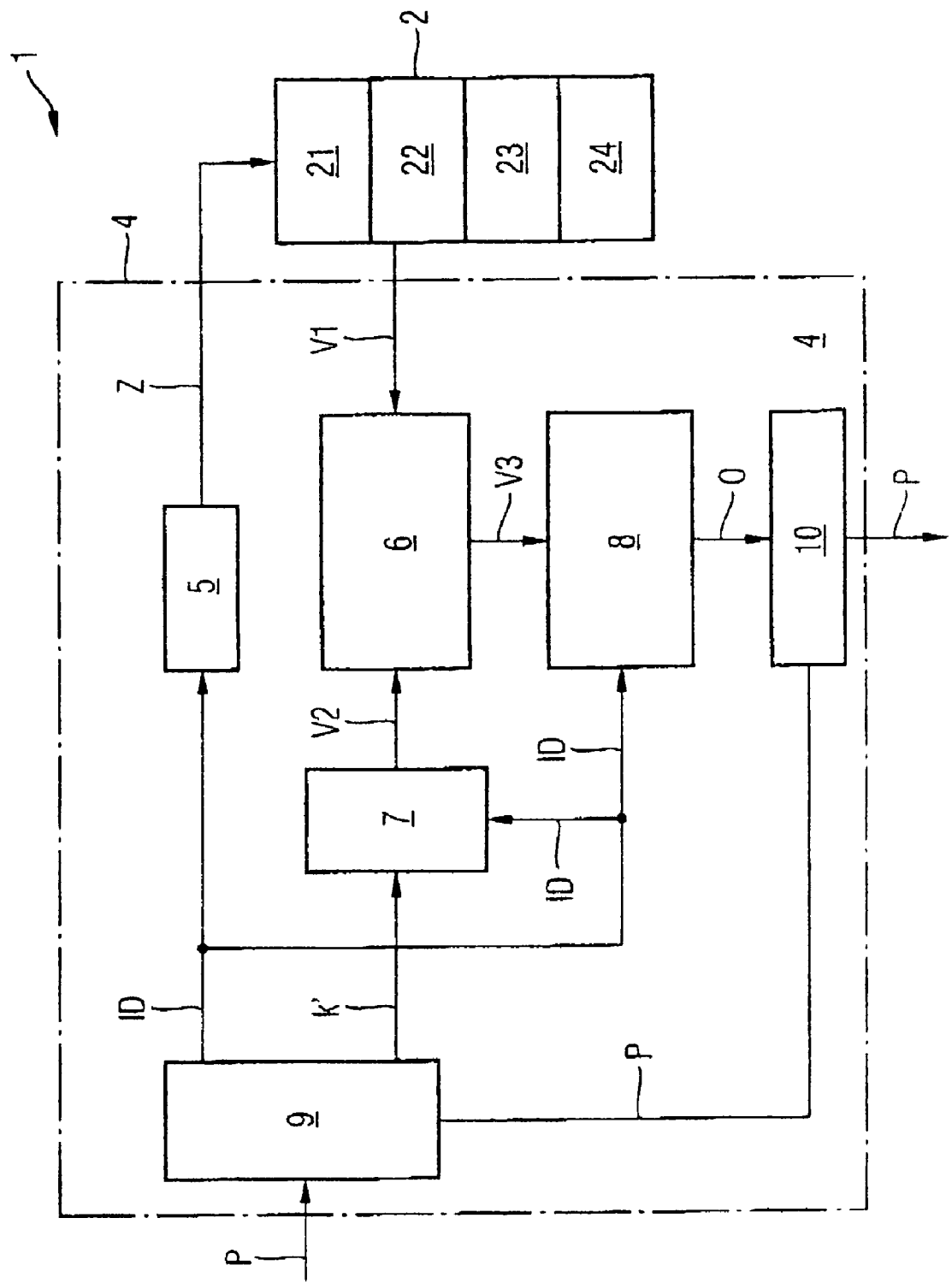
FIG. 1 is a schematic block diagram of a first preferred exemplary embodiment of an inventive circuit for forwarding data packets.

In all the figures, elements and signals which are the same or have the same function have been provided with the same reference symbols—unless indicated otherwise.

Although the present invention is described below with reference to circuits and methods for forwarding data packets, it is not limited thereto but rather may be used in a wide variety of ways.

A schematic block diagram of a first preferred exemplary embodiment of the inventive circuit 1 for forwarding data packets P in a network. The inventive circuit 1 has a control device 4 and a data store 2. The inventive circuit 1 has a control device 4 and a data store 2.

The control device 4 preferably has a reception/compression unit, a memory block pointer generator 5, a comparator device 6, a distribution device 7, a combinational logic unit 8 and an output device 10.

The reception/compression unit 9 receives the data packet P to be forwarded and compresses the destination address contained in the received data packet P using a lossless compression algorithm to produce a coded key k'. The lossless compression algorithm is preferably a Huffman algorithm, an arithmetic algorithm or a Lempel-Ziv algorithm. The coded key k' is respectively designed such that its key bit length B2 corresponds to a multiple of the data element bit length B1. ($B2 = k \cdot B1$, where $k \in [1, \ldots, \infty]$).

The data store 2 is divided into T subsidiary data stores 2t. The data store 2 stores all coded addresses a which have been coded with the same compression algorithm as the coded key k' in the network on the basis of their respective key bit length B2 in precisely one of the T subsidiary data stores. In the first exemplary embodiment shown in FIGS. 1 to 5, T is chosen to be equal to 4 without restricting the general nature. The division of the data store 2 into the four subsidiary data stores 21, 22, 23, 24 is explained by way of example in FIG. 2. In line with the invention, each of the T subsidiary data stores 2t is divided into blocks V1 of D data elements 3 of identical data element length B1, where D is the smallest common multiple of T. In each case the t-th subsidiary data store 2t, where t∈[1, ..., T], is divided into S memory blocks 2tr, and a respective memory block 2tr in the corresponding t-th subsidiary data store 2t is formed by t data elements 3.

The control device 4 stores all destination addresses in the network as a respective coded address a on the basis of their key bit length B2 in precisely one memory block 2tr in the corresponding subsidiary data store 2t in each case. This storage of the coded addresses a on the basis of their key bit length B2 is explained in detail and by way of example in FIG. 2.

In addition, the control device 4 receives the data packets P, codes the destination address contained in the received data packet P to produce a key k', and compares the coded key k' on the basis of its key bit length B2 in respective blocks with the stored, coded addresses a in the corresponding subsidiary data store 2t in order to forward the data packet P via an output O to the destination address whose associated coded address a matches the coded key k' from the received data packet P.

The control device 4, and in this context preferably the reception/compression unit 9 of the control device 4, uses a rounded-up quotient for the key bit length B2 of the coded key k' from the received data packet P and the data element bit length B1 to generate a key association identifier ID which indicates which subsidiary data store 21, 22, 23, 24 stores that coded address a of the destination address which corresponds to the coded key k' from the received data packet P.

The memory block pointer generator 5 of the control device 4 generates a memory block pointer Z for each read cycle on the basis of the generated key association identifier ID. The memory block pointer Z points to the next block V1 to be read in the corresponding subsidiary data memory 2t. Preferably, the memory block pointer generator 5 of the control device 4 generates the memory block pointer Z for the current read cycle from a total for the memory block pointer Z for the preceding read cycle and the key association identifier ID, so that the data store 2 provides the data elements 3 following the memory block pointer Z in the form of a block V1 of D data elements 3. The provision and further processing of a block V1 is described in detail and by way of example in FIG. 4.

The distribution device 7 of the control device 4 distributes the coded key k' from the received data packet P over a number of different key elements k1-k4 on the basis of the key association identifier ID, with a key element bit length B5 corresponding to the data element bit length B1, and a number of different key elements k1-k4 corresponding to the key association identifier ID. In addition, the distribution device 7 multiplies the number of different key elements k1-k4 such that a key element vector V2 of D key elements k1-k4 is produced. The multiplication of the various key elements k1-k4 is described in detail and by way of example in FIG. 3.

Preferably, the comparator device 6 of the control device 4 contains D comparators 6d, with each of the D comparators 6d having a comparator bit length B4 which corresponds to the data element bit length B1 (d∈[1, ..., D]). The D comparators 6d compare the key element vector V2 of the D key elements k1-k4 with their respective block V1 of D data elements 3 and, on the basis of the comparison, provide an output signal vector V3 of D output signals o. Preferably, the comparators 6d set an output signal O to 1 in the event of a positive comparison and to zero in the event of a negative comparison. The comparator device 6 is described in detail and by way of example with reference to FIG. 4.

The combinational logic unit 8 of the control device 4 logically combines the D output signals o with one another on the basis of the key association identifier ID. The combinational logic unit 8 uses the logic combination of the D output signals o to decide on that output O which the control device 4 needs to use to forward the received data packet P. To this end, the combinational logic unit 8 transmits the signal Output O to the output device 10, which uses the signal Output O to stipulate the output port which is used to forward the data packet P.

Preferably, the circuit 1 is part of an IP router and the data store 2 is a RAM store.

Figure 2:
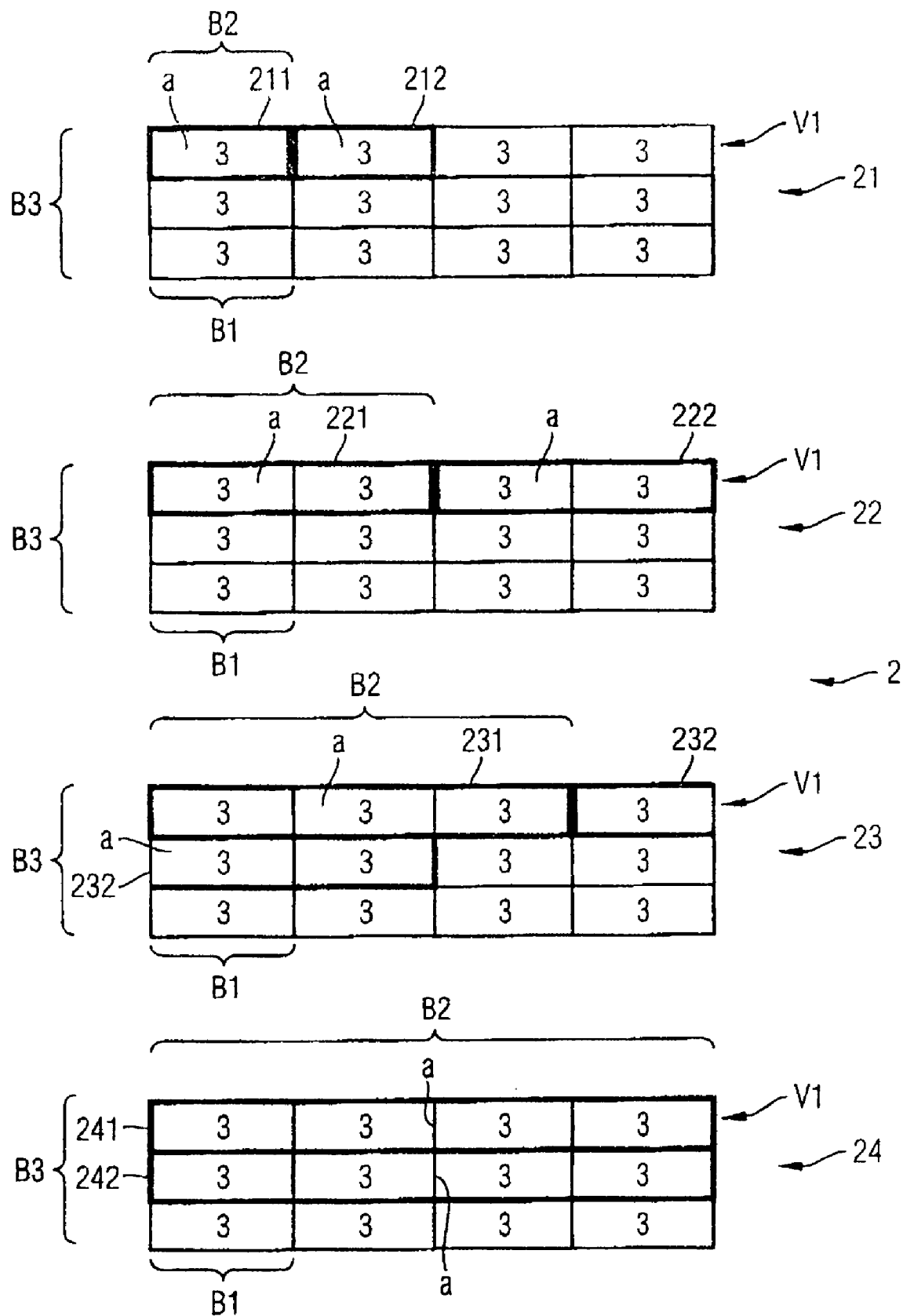
FIG. 2 is a schematic block diagram of the data store based on the first exemplary embodiment.

FIG. 2 shows a schematic block diagram of the data store 2 based on the first exemplary embodiment of the present invention. In this case, the data store 2 is divided into four subsidiary data stores 21, 22, 23, 24 (T=4). Each block V1 of each subsidiary data store 21, 22, 23, 24 has precisely 12 (D=12) data elements 3 of identical data element bit length B1. It should be noted that D (D=12) is the smallest common multiple of T (T=4). In each case the t-th subsidiary data store 2t; 21, 22, 23, 24, where t∈[1, ..., 4], is divided into S memory blocks 2tr. The number S of memory blocks 2tr of the respective t-th subsidiary data store 2t is calculated from the quotient of the number D of data elements 3 in the subsidiary data store 2t and t.

Without restricting the general nature, FIG. 2 shows only a respective block V1 of 12 respective data elements 3 for each subsidiary data store 21, 22, 23, 24.

For the first subsidiary data store 21, this means that the number S of memory blocks 2 is equal to twelve (S=12: 1=12). Accordingly, the first subsidiary data store 21 has twelve memory blocks 211, 212, with just the first two memory blocks 211, 212 of the first subsidiary data store 21 being marked in FIG. 2 for reasons of clarity. The first subsidiary data store 21 stores coded addresses a whose key bit length B2 is the same as the data element bit length B1, since a memory block 211, 212 in the first subsidiary data store 21 is formed by precisely one data element 3. The number S of memory blocks 22r in the second subsidiary data store 22 is calculated from the quotient of the number D (D=12) of data elements 3 in the second subsidiary data store 22 and t (in this case: t=2). Accordingly, the number S of memory blocks 22r for the second subsidiary data store 22 is equal to 6. For reasons of clarity, only the first two memory blocks 221 and 222 have been marked in FIG. 2 for the second subsidiary data store 22 too. Accordingly, a memory block 221, 222 is formed by precisely two data elements 3. The second subsidiary data store 22 is therefore used to store those coded addresses a whose key bit length is equal to twice the data element bit length B1.

The number S of memory blocks 23r in the third subsidiary data store 23 is calculated from the quotient of the number D (D=12) of data elements 3 in the third subsidiary data store 23 and t (t=3). The number S of memory blocks 23r for the third subsidiary data store 23 is therefore equal to four. For reasons of clarity, only the first two memory blocks 231, 232 in the third subsidiary data store 23 have been marked in FIG. 2 in this case too. A memory block 231, 232 in the third subsidiary data store 23 is formed by precisely three data elements 3. Accordingly, the third subsidiary data store 23 is used to store exclusively those coded addresses a whose key bit length B2 is equal to three times the data element bit length B1.

The number S of memory blocks 24r in the fourth subsidiary data store 24 is calculated from the quotient of the number D (D=12) of data elements 3 in the fourth subsidiary data store 24 and t (in this case: t=4). The number S of memory blocks 24r in the fourth subsidiary data store 24 is therefore equal to 3. For reasons of clarity, only the first two memory blocks 241, 242 have been marked in FIG. 2 for the fourth subsidiary data store 24. A memory block 241, 242 in the fourth subsidiary data store 24 is formed by precisely four data elements (t=4). Accordingly, the fourth subsidiary data store 24 is used to store exclusively coded addresses a whose key bit length B2 is four times the data element bit length B1.

FIG. 3 shows a schematic table for generating the key element vector V2 on the basis of the key association identifier ID based on the first exemplary embodiment of the present invention. In the first exemplary embodiment, the data store 2 has been divided into four subsidiary data stores 21, 22, 23, 24. Accordingly, the number T of subsidiary data stores 21, 22, 23, 24 is equal to four. From T, the number D is calculated using the smallest common multiple (in this case: D=12).

Accordingly, the dimension of the key element vector V2 is also 12. The key element vector V2 is generated on the basis of the key association identifier ID by the distribution device 7 in the control device 4. On the basis of the key association identifier ID, the distribution device 7 distributes the coded key k' from the received data P over a number of different key elements k1-k4.

If ID=1, therefore, then the coded key k' from the received data packet P needs to be compared with the stored, coded addresses a in the first subsidiary data store 21.

If one has been calculated for the key association identifier ID, the coded key k' from the received data packet P thus has a key bit length B2 which is the same as the data element bit length B1. Hence, only one key element k1 is necessary in order to store coded key k' from the received data packet P. Accordingly, the key element k1 storing the coded key k' in its entirety is multiplied 12 times in order to form the key element vector V2 from D (D=12) key elements k1.

If the key association identifier ID is equal to two then the coded key k' from the received data packet P is compared with the stored coded addresses a of the second subsidiary data store 22, so that two different key elements k1, k2 need to be provided for storing the coded key k' from the received data packet P. The two key elements k1, k2 need to be multiplied six times, so that the key element vector V2 of D (D=12) key elements k1, k2 is formed. Hence, the first key element k1 is stored in the key element vector elements V2-1, V2-3, V2-5, V2-7, V2-9, V2-11 and the second key element is stored in the key element vector elements V2-2, V2-4, V2-6, V2-8, V2-10 and V2-12.

A similar situation applies to the key association identifiers ID=3 and ID=4. It should be noted that the key element bit length B5 corresponds to the data element bit length B1, and the number of different key elements k1-k4 corresponds to the key association identifier ID.

Figure 4:
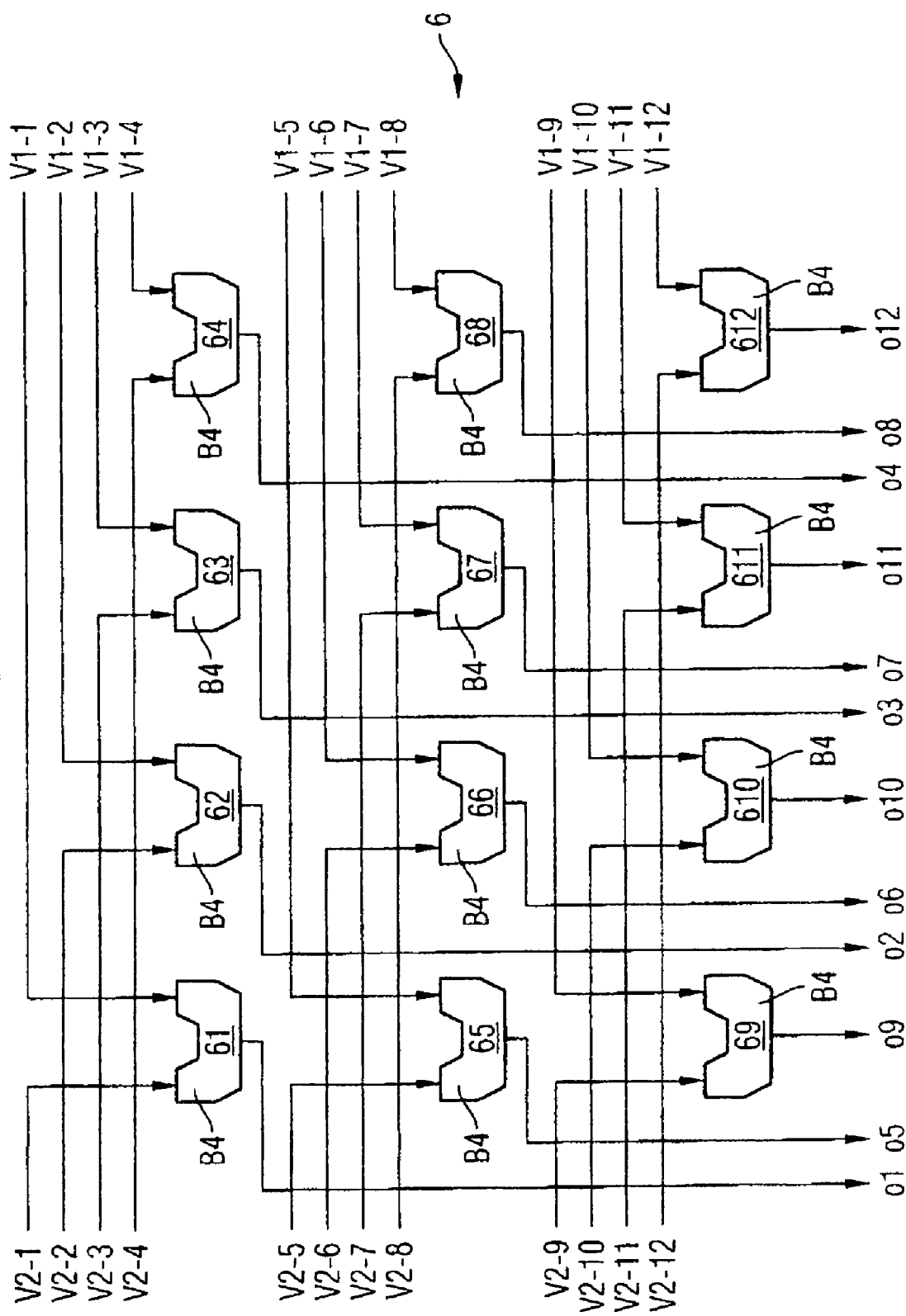
FIG. 4 is a schematic block diagram of the comparator device based on the first preferred exemplary embodiment.

FIG. 4 shows a schematic block diagram of the comparator device 6 based on the first preferred exemplary embodiment of the present invention. As already explained above, D=12 is calculated for T=4, so that twelve different comparators 61-612 need to be provided in the comparator device 6 based on the first preferred exemplary embodiment. By way of example, the first comparator 61, which has a comparator bit length B4 corresponding to the data element bit length B1, logically combines the first key element vector element V2-1 with a first block element V1-1 of the respective block V1 and, on the basis of this comparison, provides the first output signal 01. A similar situation applies to the remaining 11 comparators 62-612. Hence, the 12 comparators 61-612 provide 12 output signals 01-012. Since each cycle involves 12 block elements V1-1-V1-12 being compared with 12 key element vector elements V2-1-V2-12, the address comparison is performed in blocks regardless of the key bit length.

FIG. 5 shows a schematic table for logically combining the output signals o using the combined logic unit 8 based on the first exemplary embodiment of the present invention. The combinational logic unit 8 logically combines the 12 output signals 01-012 with one another on the basis of the key association identifier ID (ID∈[1, . . . , 4]). The combinational logic unit 8 uses the logic combination of the twelve output signals o1-o12 to decide on an output O which the control device 4 needs to use to forward the received data packet P.

Depending on the key association identifier ID, there are D/ID possible outputs O. If the key association identifier is ID=2, for example, then there are six possible outputs 01-06, since the second subsidiary data store 22 (ID=2) stores precisely six memory blocks. Hence, if the key association identifier is ID=2, for example, and the logic combination of the ninth output signal and of the tenth output signal produces one (o9 & o10=1) then the output signal Output 05 needs to be set to one and the data packet P needs to be forwarded by the output device 10 via the output port which corresponds to the output 05.

Figure 6:
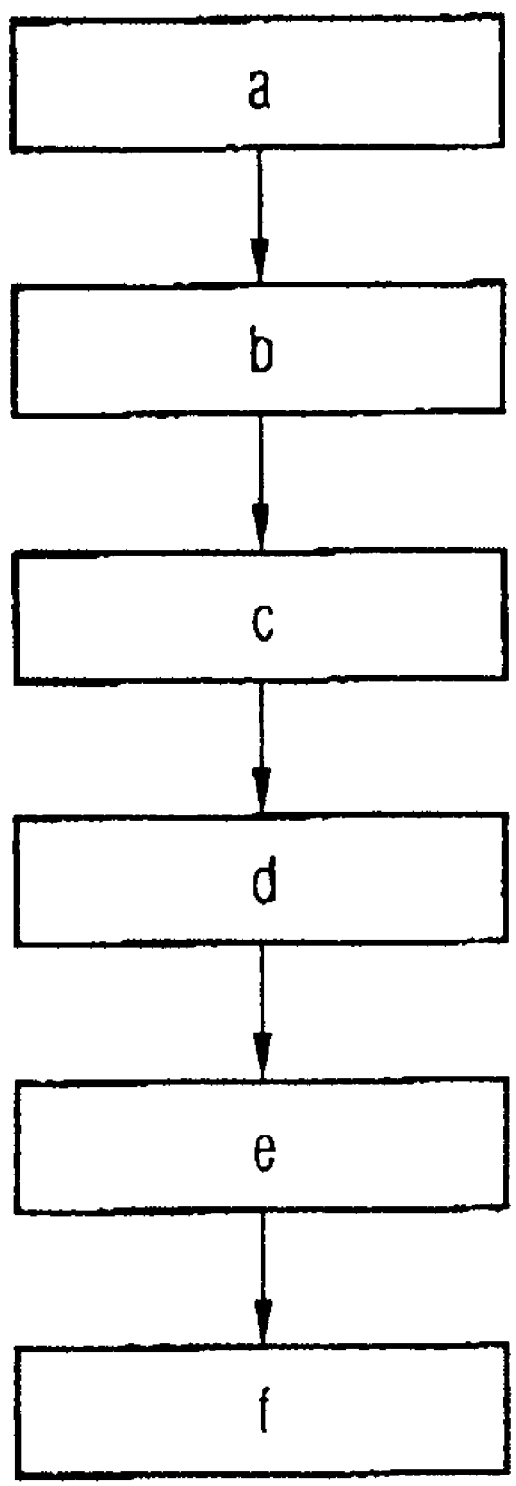
FIG. 6 is a schematic block diagram of a second preferred exemplary embodiment of the inventive method for forwarding data packets.

FIG. 6 shows a schematic block diagram of a second preferred exemplary embodiment of the inventive method for forwarding data packets P.

The inventive method for forwarding data packets P in a network has the following method steps:

Method step a: all destination addresses in the network are stored as coded addresses on the basis of their respective key bit length in precisely one of T subsidiary data stores of a data store in each case, with each of the T subsidiary data stores being divided into blocks of D data elements of identical data element bit length, where D is the smallest common multiple of T;

Method step b: a data packet is received;

Method step c: a destination address is extracted from the received data packet;

Method step d: the destination address from the received data packet is coded to produce a coded key;

Method step e: the coded key from the received data packet is compared on the basis of its key bit length with the stored, coded addresses in the corresponding subsidiary data store in respective blocks;

Method step f: the data packet is forwarded via an output to the destination address whose associated coded address matches the coded key from the received data packet.

Although modifications and changes may be suggested by those skilled in the art, it is the intention of the inventors to embody within the patent warranted heron all changes and modifications as reasonably and properly come within the scope of their contribution to the art.

We claim as our invention:

1. A circuit for forwarding data packets in a network, comprising: a data storage comprising T data sub-storages for storing all network addresses which are coded by a particular coding method on the basis of their respective key bit length in precisely one of said data sub-storages; the t-th data sub-storage of said data sub-storages being divided into blocks having D data elements of identical data element bit length; where t∈[1, ..., T] and D is the smallest common multiple of t∈[1, ..., T]; and a control device receiving said data packets, each having a destination address;

said control device coding the destination address of a received data packet of said data packets using said particular coding method to produce a coded key and comparing said coded key on the basis of its key bit length with said coded addresses stored in a corresponding data sub-store of said data sub-storages block by block to forward said received data packet via an output to said destination address whose associated coded address matches said coded key from said received data packet.

2. The circuit of claim 1, wherein the respective t-th data sub-store, where t∈[1, ..., T], is divided into S memory blocks and the respective of said memory blocks in said corresponding t-th data sub-storage is formed by t of said data elements; all destination addresses in said network being stored as said coded addresses on the basis of their key bit length in precisely one of said memory blocks in a corresponding of said data sub-storages in each case.

3. The circuit of claim 1, wherein all of said data sub-storages have an identical data sub-store bit length.

4. The circuit of claim 2, wherein said number S of said memory blocks in said respective t-th data sub-storage is the quotient of said number D of said data elements in said data sub-storage and t.

5. The circuit of claim 1, wherein said particular coding method is a lossless compression algorithm.

6. The circuit of claim 5, wherein said lossless compression algorithm is a Huffman algorithm, an arithmetic algorithm or a Lempel-Ziv algorithm.

7. The circuit of claim 1, wherein said control device generates a key association identifier by utilizing a ratio of said key bit length of said coded key from said received data packet and said data element bit length; said ratio being rounded up and said key association identifier indicating which of said data sub-storages stores said coded address of said destination address corresponding to said coded key from said received data packet.

8. The circuit of claim 7, wherein said control device comprises a memory block pointer generator which, on the basis of said key association identifier, generates a memory block pointer for each read cycle which respectively points to the next block of said blocks to be read in said corresponding data sub-storage.

9. The circuit of claim 8, wherein said memory block pointer generator generates said memory block pointer for the current of said read cycles from a total for said memory block pointer for the preceding of said read cycles and said key association identifier, so that said data storage provides said D data elements following said memory block pointer in the form of said block of said D data elements.

10. The circuit of claim 7, wherein said control device comprises a distribution device which, on the basis of said key association identifier, distributes said coded key from said received data packet over a number of different of said key elements, with said key element bit length corresponding to said data element bit length, and said number of said different key elements corresponding to said key association identifier, and multiplies said number of said different key elements such that a key element vector of D key elements is produced.

11. The circuit of claim 1, wherein said control device comprises a comparator device having D comparators, each of said comparators having a comparator bit length which corresponds to said data element bit length.

12. The circuit of claim 10, wherein said control device comprises a comparator device having D comparators, each of said comparators having a comparator bit length which corresponds to said data element bit length.

13. The circuit of claim 12, wherein said D comparators compare said key element vector of said D key elements with a block of said D data elements in each case, and, on the basis of said comparison, provide an output signal vector of D output signals; said D comparators setting one of said output signals to one in the event of a positive comparison and to zero in the event of a negative comparison.

14. The circuit of claim 13, wherein said control device comprises a combinational logic unit which logically combines said D output signals on the basis of said key association identifier and uses said logic combination to decide on said output which said control device uses to forward said received data packet.

15. The circuit of claim 1, being part of an IP router.

16. The circuit of claim 1, wherein said the data storage is a RAM store.

17. A method for forwarding data packets in a network, comprising the steps of:

storing all destination addresses in said network as coded addresses being coded by a particular coding method on the basis of their respective key bit length in precisely one of T data sub-storages of a data storage in each case; each of said T data storages being divided into blocks of D data elements of identical data element bit length, where D is the smallest common multiple of t∈[1, ..., T];

receiving a data packet having a destination address;

extracting said destination address from said received data packet;

producing a coded key by coding said destination address from said received data packet using said particular coding method;

comparing said coded key from said received data packet on the basis of its key bit length with said coded addresses being stored in the corresponding of said data sub-storages block by block; and forwarding said data packet via an output to said destination address whose associated coded address matches said coded key from said received data packet.

18. The method of claim 17, wherein a respective t-th data sub-storage of said data-sub-storages, where t∈[1, ..., T], is divided into S memory blocks and a respective of said memory blocks in said corresponding t-th data sub-storage is formed by t data elements; all of said destination addresses in said network being stored as said coded addresses on the basis of their key bit length in precisely one of said memory blocks in said corresponding data sub-storages in each case.

19. The method of claim 18, wherein each of said T data sub-storages have an identical data sub-store bit length.

20. The method of claim 17, comprising a lossless compression algorithm as said particular coding algorithm.

21. The method of claim 20, comprising a Huffman algorithm, an arithmetic algorithm or a Lempel-Ziv algorithm as said lossless compression algorithm.

22. The method of claim 17, comprising generating a key association identifier by utilizing a ratio of said key bit length of said coded key from said respective received data packet and said data element bit length; said ratio being rounded up and said key association identifier indicating which of said data sub-storages stores said coded address of said destination address corresponding to said coded key from said received data packet.

23. The method of claim 22, comprising generating a memory block pointer, on the basis of said key association identifier, for each read cycle; said memory block pointer pointing to the next block of said D data elements which is to be read in said corresponding data sub-storage.

24. The method of claim 23, comprising generating said the memory block pointer for the current of said read cycles from a total for said memory block pointer for the preceding of said read cycles and said key association identifier, so that said memory block pointer is used to provide the next D data elements to be read in the form of said block of said D data elements.

25. the method of claim 22, comprising distributing said coded key from said received data packet on the basis of said key association identifier over a number of different key elements; a key element bit length of said key elements corresponding to said data element bit length, the number of said different key elements corresponding to said key association identifier, and said number of said different key elements being multiplied such that said key element vector of said D key elements is formed.

26. The method of claim 17, comprising comparing said key element vector of said D key elements with a block of said D data elements in each case, and, on the basis of the comparison, providing an output signal vector of output signals, said output signal being set to one in the event of a positive comparison and to zero in the event of a negative comparison.

27. The method of claim 26, comprising combining logically said D output signals on the basis of said key association identifier and using said logic combination to decide which of said outputs is used to forward said received data packet.

* * * * *